United States Patent [19]

Burns

[11] Patent Number: 5,045,684

[45] Date of Patent: Sep. 3, 1991

[54] LIGHT DETECTION WITH WAVEGUIDE HAVING FULLY AND PARTIALLY REFLECTING SIDES

[75] Inventor: Michael J. Burns, Earleton, Fla.

[73] Assignee: University of Florida, Gainesville, Fla.

[21] Appl. No.: 485,892

[22] Filed: Feb. 28, 1990

[51] Int. Cl.$^5$ .............................................. H01J 40/14
[52] U.S. Cl. .............................. 250/206.1; 250/227.31
[58] Field of Search ...................... 250/227.31, 227.32, 250/202.2, 203.6, 561, 206.1; 356/1, 5, 141, 152

[56] References Cited

U.S. PATENT DOCUMENTS

| | | | |
|---|---|---|---|
| 3,039,002 | 6/1962 | Guerth | 250/203.6 |
| 3,978,334 | 8/1976 | McCardell | 250/225 |
| 4,047,816 | 9/1977 | Pell et al. | 250/203.2 |
| 4,049,644 | 9/1977 | Wennerstrom | 250/233 |
| 4,123,165 | 10/1978 | Brown et al. | 250/203.2 |
| 4,371,897 | 2/1983 | Kramer | 250/227.31 |
| 4,602,154 | 7/1986 | Taniguchi | 250/227 |
| 4,840,445 | 6/1989 | Lerat | 350/6.8 |

OTHER PUBLICATIONS

IBM Technical Disclosure Bulletin, vol. 13, No. 3, Aug. 1970.

Primary Examiner—David C. Nelms
Assistant Examiner—Que T. Le
Attorney, Agent, or Firm—Kerkam, Stowell, Kondracki & Clarke

[57] ABSTRACT

A low-cost wide-band light detection system is disclosed using a light conducting member which is a long dielectric waveguide having a phototransistor at a far end. The waveguide or light conducting member is designed to have a specified leakage rate with one side of the guide being perfectly reflecting and the other side being only partially reflecting. The output of the phototransistor or other photodetector is dependent upon the intensity and position of the beam which strikes an incident zone of the photodetection device. The photodetection device may function as a laser power monitor, while advantageously allowing most of the laser power to be used for an experiment or other purpose. Additionally, the device may be used as a position sensitive detector (PSD). By using one of the devices as a power monitor and another of the devices as a PSD in the same experiment, one can determine the motion or displacement of an object under test independent of instability in the laser or other source of light.

23 Claims, 4 Drawing Sheets

LIGHT DETECTION WITH WAVEGUIDE HAVING FULLY AND PARTIALLY REFLECTING SIDES

Research leading to the completion of the invention described herein was conducted under the Defense Advanced Research Projects Agency of the United States Department of Defense, DARPA Grant No. MDA-972-88-J-1006. As a result thereof, the United States Government has certain rights in and to the invention claimed herein.

BACKGROUND OF THE INVENTION

This invention relates to a system and method of light detection. More specifically, this invention relates to a technique of measuring the intensity of light in order to monitor the intensity of light from a light source and/or in order to measure motion of an object which is being tested.

Optical methods are used in a number of technical fields in order to extract information about a wide variety of systems. As a consequence, a large variety of photodetectors have been developed. Numerous techniques exist which utilize lasers to measure linear and angular displacements or motion. In most applications, linear displacement is best measured using interference techniques. Angular displacement measurements are generally not amenable to interference techniques without adding mass or altering the torsion constant of the system. An example of the latter case is the use of torsional apparatus to measure shear waves and moduli of fibers, polymers, gels, and colloids. For the measurement of small angular deflections in these types of experiments, position-sensitive detectors (PSDs) very often play a large roll in converting the displacement of a laser beam into an electrical signal proportional to the displacement.

Although various PSD designs have been used, they, and the experiments which use them, have been subject to a number of limitations or disadvantages.

Previous PSD designs are usually relatively expensive to produce due to complexities in manufacturing and/or a requirement for a relatively large number of components. For example, a conventional solid state PSD may use a photodiode array. The array has a relatively large number of photodiodes which are used to generate a relatively large number of outputs. By determining which photodiode or photodiodes within the array are being illuminated, one can determine position information relative to the light, this position information being dependent upon the linear or angular displacement or motion of the object under test. Because one needs a sufficient number of photosensitive cells such as photodiodes within the array in order to sense any possible position for the object under test, the array requires a large number of components such that it is relatively expensive.

A further problem which occurs in experiments using light for measurements is that it is difficult to measure the light which is being applied to the object under test at the same time as the test is being conducted. In other words, laser power monitors generally consume 100% of the laser power and cannot be used to measure the laser power while using the laser to do something useful. Currently, laser power monitors are usually calorimeters. They provide the average power, but do not provide the peak power or laser pulsed profile in a pulsed laser.

Although a current high speed photodetector such as Scientec model 301-020 might be used in a crude manner to monitor laser power while allowing use of the laser for application to an experiment, this could only be accomplished by adding several relatively expensive external components.

Therefore, there has been a need for a relatively low cost laser power monitor which can sense the laser power while the bulk of the laser power is being used upon an experiment. Additionally, there has been a need for such a monitor which can provide the peak power or laser pulse profile in a pulsed laser.

The use of a power monitor for measuring the intensity or power of light from a laser or other collimated light source may be useful in a number of different situations. In particular, where the output of an experiment is dependent not only on the object under test, but is also dependent upon the intensity of the light applied to the object, an unstable source of light may introduce inaccuracies into the experiment. In other words, a change in output might be due to changes in the object under test or might be due to variations in the intensity of light supplied from the light source. Under such circumstances, the ability to accurately measure the light from the light source could be used to compensate for variations in the light source. Since traditional photodiode array PSD systems give positional information independently of the incident intensity, these relatively expensive systems would not necessarily require a power monitor. However, such a power monitor may be useful other numerous other situations.

OBJECTS AND SUMMARY OF THE INVENTION

Accordingly, it is a primary object of the present invention to provide a new and improved light detection system and method.

A more specific object of the present invention is to provide a light detection method and system wherein an individual detector (as opposed to an array) can provide an output dependent on the displacement or motion of an object under test.

Yet another object of the present invention is to provide light detection for measurement purposes which is highly accurate and uses a relatively easily constructed and less expensive photodetector.

A still further object of the present invention is to provide light detection for detecting the intensity or power of the light, while allowing the bulk of the light's power to be used upon an experiment or in another useful fashion.

Another object of the present invention is to provide a position sensitive photodetector which avoids or minimizes the disadvantages discussed above.

The above and other objects of the present invention which will become more apparent as the description proceeds are realized by a light detection system. The light detection system includes an elongate light conducting member having a substrate of transparent material with a first side and a second side, the first side having a partially reflecting surface, the second side having a reflecting surface which is at least partially reflecting (i.e., it may be fully reflecting). The light conducting member has an incident zone for entry of light into the light conducting member and a detection zone for detection of light which has reflected multiple times between the first side and the second side. A photodetector is mounted to detect light at the detection zone. The photodetector is an individual detector which provides an output dependent on the position and intensity of light (i.e., the detector does not require multiple outputs from various array elements to supply the information) which hits the light conducting member at the incident zone. In other words, the output of the individual detector is dependent on the position of light hitting the light conducting member. Thus, one advantageously does not need an array in order to detect the position information. The partially reflecting surface is preferably a continuous coating having a uniform coefficient of reflection from adjacent the incident zone to adjacent the detection zone. The at least partially reflecting surface on the second side is a continuous coating having a uniform coefficient of reflection from adjacent the incident zone to adjacent the detection zone. The first side is planar and the second side is planar and is parallel to the first side. The partially reflecting surface of the first side has a coefficient of reflection of R and R is between 0.99 and 0.05. More specifically, R is between 0.99 and 0.50. Most specifically, R is between 0.98 and 0.90. The at least partially reflecting surface of the second side is fully reflecting. The photodetector is a phototransistor. The system may further comprise a light source for directing light onto the first surface from the light conducting member.

The method of detecting light according to the present invention includes applying light to an incident zone of an elongate first light conducting member having a substrate of transparent material with a first side and a second side such that light repeatedly reflects between a partially reflecting surface on the first side and a reflecting surface which is at least partially reflecting on the second side, the light going to a detection zone. Further, a first photodetector is used to detect light at the detection zone, the first photodetector being an individual detector and providing an output dependent on the position and intensity of the light applied to the first light conducting member. The light is applied to the partially reflecting surface of the first side of the first conducting member from an incident beam from a light source and over 50% of the incident beam is reflected as an external reflected beam. The output is dependent on the intensity of the incident beam. The external reflected beam is directed to a mirror on an object whose motion is to be measured so as to generate a secondary reflected beam. The secondary reflected beam is applied to an incident zone of an elongate second light conducting member having a substrate of transparent material with a partially reflecting surface on a first side and a reflecting surface which is at least partially reflecting on the second side such that the light repeatedly reflects between the partially reflecting surface on the first side and the at least partially reflecting surface on the second side of the second light conducting member. A second photodetector is used to detect light at a detection zone of the second light conducting member, the second photodetector being an individual detector and providing an output dependent on the motion of the object and the intensity of the incident beam. The outputs of the first and second photodetectors are supplied to a circuit which generates an output dependent on the motion of the mirror and independent of variations in intensity of the incident beam. Light is directed from a light source onto the mirror such that light reflected from the mirror is the light applied to the incident zone of the first light conducting member, the output of the first photodetector being dependent on motion of the object.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
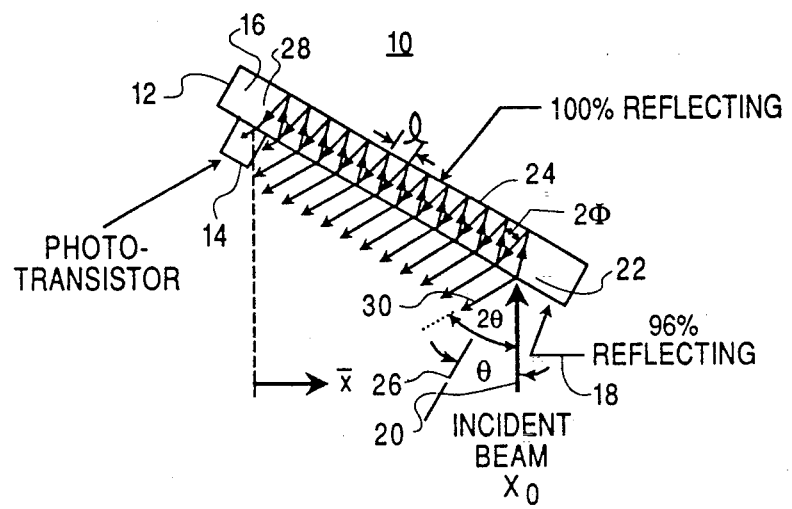
FIG. 1 shows a photodetection device according to the present invention.

FIG. 1 shows a side view of a photodetection device 10 according to the present invention. The device 10 includes a light conducting member 12 having a photodetector such as phototransistor 14 mounted thereon. The light conducting member 12 has a transparent (i.e., transparent for the light which is to be used by the device) substrate 16 with a first planar side 18 with a partially reflecting surface. Preferably, the coefficient of reflection R is 0.96 corresponding to the surface reflecting 96% of the light applied thereto by way of incident beam 20 applied at an incident zone 22. Opposite to the first side 18 is a second and parallel planar side 24 which is fully or "perfectly" reflecting. As shown, the incident beam is applied at a displacement $X_0$ relative to the X axis from the phototransistor 14. The incident beam 20, which causes external reflected beam 26, is applied at an angle of $\theta$ from the normal 30 to the first side 18.

The distance between the first side 18 and the second side 24 must be a thickness greater than the wave length of the laser which is supplying the beam 20. The reflecting surfaces on sides 18 and 24 are smooth and the angle of incidence is less than Brewster's angle ($TAN^{-1}(n_d/n_o)$) where $n_d$ and $n_o$ are the indices of refraction of the detector and air material. Under these conditions, a small portion of the incident beam 20 propagates by secular reflection (approximately independent of polarization) between the walls as illustrated in FIG. 1. If the incident beam 20 has an intensity $I_0$ and strikes the detector at a distance L from the phototransistor at an angle $\theta$ relative to the normal, then the beam which enters is of intensity $(1-R) I_0$ and propagates at an angle of $\phi$ given by Snell's law:

$$n_O \sin(\Theta) = n_d \sin(\phi). \tag{1}$$

If the detector is of thickness d, then the distance between successive reflections of the beam from the partially reflecting side is $$l = 2d/\cot(\phi). \quad (2)$$

The number of times (N) the internally reflected beam will strike the partially reflecting side before entering the phototransistor is $$N = \{[L \cot(\phi)]/(2d)\}, \quad (3)$$

where the curly brackets denote that we take the largest integer part. Since each reflection from the partially reflecting side is reduced by a factor of R, after N reflections the internally reflected beam is reduced by $R^N$. For a beam as described above, the total intensity ($I_D$) which reaches the phototransistor is $$I_D = I_0(1-R)R^{\{[L\cot(\phi)]/(2d)\}} \quad (4)$$

If the x direction is defined to be towards the phototransistor, but perpendicular to the incident laser beam (see FIG. 1), then the above expression is $$I_D = I_0(1-R)R^{\{[x\cot(\phi)]/[2d\cos(\Theta)]\}} \quad (5)$$

where $$\phi = \sin^{-1}[n_o \sin(\Theta)/n_d].$$

In the limit of large numbers of internal reflections, the discreteness of the exponent can be ignored reducing the above expression to $$I_D = I_0(1-R)R^{[x\cot(\phi)]/[2d\cos(\Theta)]} \quad (6)$$

Usually one looks at small oscillating displacements of the laser beam, in which case one should know the position-sensitive detectors' behavior for small changes in x. The above expression can be rewritten as:

$$I_D = I_0(1-R)\exp\{[x \ln(R)\cot(\phi)]/[2d \cos(\Theta)]\}, \quad (7)$$

where ln(R) denotes the logarithm of R. Since R < 1, ln(R) is always negative.

Suppose the position of the beam is an oscillating function of time, i.e., $x \rightarrow X_o + \beta \sin(wt)$. $\beta$ is the amplitude of the oscillating beam displacement and w is the angular frequency. Equation (7) then becomes $$I_D = I_o(1-R)\exp\{\alpha[X_o + \beta \sin(wt)]\}, \quad (8)$$

where $$\alpha = \ln(R)\cot(\phi)/[2d \cos(\Theta)].$$

This expression can be written as $$I_D(t) \approx I_{Do} + (\delta I_D/\delta x)_o \beta \sin(wt), \quad (9)$$

where $$(\delta I_D/\delta x)_o = \{\ln(R)\cot(\phi)/[2d\cos(\Theta)]\}I_{Do},$$

and $I_{Do}$ is the static (nontime-dependent) intensity at the phototransistor when the beam is at $X_o$. From the above expressions, the intensity at the phototransistor varies exponentially with beam displacement, but for oscillating displacement is approximately linear with the amplitude of oscillation.

From equation 7 above, one can appreciate that the light as detected at the phototransistor 14 placed adjacent a detection zone 28 is dependent upon the beam position of incident beam 20 and the incident intensity. This means that output signals indistinguishable from those produced by a positional changes can result if the beam 20 is supplied by an unstable laser or other unstable source. Depending upon the degree of instability in the laser source, and the amount of accuracy one wishes to obtain in the use of the device 10 for position sensing, this may not pose a problem. However, since the light as detected by the phototransistor 14 remains a linear function of the intensity of incident beam 20, the present photodetection device 10 may be used as a laser power monitor for stationary beams. As will be discussed in more detail below, one of the devices 10 could be used for monitoring the laser power from a stationary beam and a second of the devices 10 may be used to measure the displacement of the beam after its interaction with an experiment. This will allow one to separate those signal changes due to beam displacement and those due to an unstable or drifting laser.

The device fabrication will be discussed in more detail below, but it may generally be noted that the first surface 18 includes a partially reflecting coating which is continuous and has a uniform coefficient of reflection from adjacent the incident zone 22 to adjacent the detection zone 28. A discontinuity in the coating may be placed on the first side 18 adjacent to where the phototransistor 14 is to be mounted. The device 10 in effect functions as a leaky waveguide. Advantageously, the external reflected beam 26 would include the bulk of the energy of the incident beam 20 and the beam 30 would therefore be available for applying to the experiment or for other useful purposes.

The photosensitivity of the device 10 can be optimized by both optimizing the angle of the incident beam striking the detector and optimizing the partially reflecting coating. The optimal angle of incidence ($\Theta_o$) must satisfy $$(n_d/n_o)^2 = \cot^2(\Theta_o) + \sin^2(\Theta_o). \quad (10)$$

If, for example, the beam position is oscillating about some specific position $X_o$ and striking the PSD at the optimal incident angle $\Theta_o$, optimal performance will occur if the partially reflecting side has a reflectivity of $$R_{opt} = [X_o\cot(\phi_o)]/\{[X_o\cot(\phi_o)] + [2d \cos(\Theta_o)]\}. \quad (11)$$

where $$\phi_o = \sin^{-1}[n_o\sin(\Theta_o)/n_d]$$

For a detector with the waveguide fabricated using single crystal sapphire, $n_d = 1.767$ for a 0.6326-μm HeNe laser. The optimal angle of incidence is (using $n_o = 1.000$ for air) 30.5°. If the average position of the incident beam is 0.25 in. from the phototransistor and the sapphire is 0.020 in. thick, optimal photosensitivity will then be achieved if the partially reflecting side is fabricated with an $R_{opt}$ of 0.96. Therefore, if the PSD is used as a beam-intensity monitor mirror as mentioned above, only ~4% of the laser power is lost into the device.

The waveguides were fabricated using either 0.02-in.-thick single-crystal sapphire or 0.04-in.-thick standard commercial fire-polished Pyrex microscope slides. The sapphire is transparent (>50%) for wavelengths from 0.2 to 5 μm, while Pyrex is transparent from 0.3 to 3 μm. A suitable choice of waveguide material can extend the usable range of this position-sensitive detector. Use of sodium chloride for the guide material would allow operation (with the substitution for the phototransistor of a cryogenic photodetector) to wavelengths as large as ~22 μm. Magnesium fluoride would allow construction of a waveguide transparent from 0.1 to 8 μm.

The waveguides were cut into small rectangles of 1.0 inch long×0.25 inch wide and cleaned by acetone in an ultrasonic cleaner for approximately 10 min. The thickness between first side 18 and second side 24 has been made as thin as 10 microns. It must be at least as thick as the wavelength of the light. The guides were then carefully rinsed in HPLC reagent-grade ethanol and allowed to air dry. This procedure was sufficient for good adhesion of the reflective coatings to the waveguide, although any precleaning procedure for thin-film work should be sufficient. The reflective coatings were fabricated using a Veeco 3-in. Microetch ion-sputtering system and consisted of Al. Al was chosen because of its excellent adhesion to glass, quartz, and sapphire, as well as its high reflectivity for the visible wavelengths and the ease at which high-quality films can be made. A small dot of rubber cement was placed at a spot near one end where the phototransistor was to be mounted. The guide was then placed in the sputtering chamber so that the side with the rubber cement would get coated. If possible, the guide was mounted so that its transparency could be monitored during the coating process. If this was not possible, a clean glass cover slip was placed in the chamber near the guide, but situated so that its transparency could be monitored. The chamber was evacuated to a pressure of $\sim 5 \times 10^{-7}$ Torr and then boosted to $6 \times 10^{-5}$ Torr with Ar for the sputtering process. The Microetch ion beam sputtered Al onto the guide (and cover slip) at a rate of ~5 Å/s. The deposition of Al was stopped when the total thickness reached 190 Å. Previous measurements on a series of Al films of varying thicknesses sputtered in our system (under identical conditions) indicated this to correspond to films of ~96% reflectivity. Device-to-device uniformity can be increased by mounting a light and phototransistor inside the chamber to measure the film transmission (1 - R) in situ.

When the desired Al thickness was reached, the deposition was halted, the chamber was vented, and the guide was repositioned to coat its backside. The same deposition procedure as described above was followed, but without monitoring the appearance of the slide, and 3000 Å of Al was deposited to form a "100%" reflecting mirror.

The guide was removed from the coating chamber and rinsed in acetone to remove the rubber cement. After the rubber cement dissolved away, there was a clear window into the interior of the guide. The phototransistors used were type MDR 3050 in cans with glass windows on top. The phototransistors were then epoxied window to window to the guide using transparent epoxy, which was then allowed to cure. If operation into the ultraviolet (UV) was desired or greater photosensitivity required, a diamond saw was used to slice the top (and window) off the phototransistor, and this was mounted to the guide window using Torr seal epoxy around the can edge. Using sapphire for the waveguide and a MDR3050 phototransistor with its window removed will produce a PSD which should function from ~1 to ~0.3 μm. The long-wavelength cutoff is due to the drop in the phototransistor efficiency, while the short-wavelength cut-off is due to the transparency of the sapphire.

The back of the guide with the "100%" mirror was then coated with flat charcoal black paint, as was the sides and the can of the phototransistor. The edge of the epoxy seal between the phototransistor and the guide was also painted with flat black to prevent stray light leaks. After this step, only the partially reflecting side was unpainted, and the only light which could reach the phototransistor junction is light which entered the guide through the partially reflecting side. If this remaining unpainted area was too large for the specific experiment, then additional flat black paint was used to reduce the entrance area of the guide.

Several comments about the fabrication of these devices are in order. First, the specific microstructure of the films will determine how the reflectivity will vary with thickness. The microstrucrure can vary between film-deposition systems even under similar deposition conditions. For this reason, if device optimization is important, it is advisable to fabricate several test films to determine the thickness dependence of the reflectivity or measure the film properties in situ as described above. Second, Al films can also be easily produced by electron-beam evaporation and thermal evaporation, provided that the films adhere to the waveguide sufficiently to withstand handling during fabrication and use. Third, Al was chosen because it is trivial to make films of excellent optical quality and adhere extremely well to most substrates, especially oxides such as glass, quartz (both $SiO_2$), and sapphire ($Al_2O_3$). However, any metal films will work and in specific applications may be more appropriate.

Figure 2A:
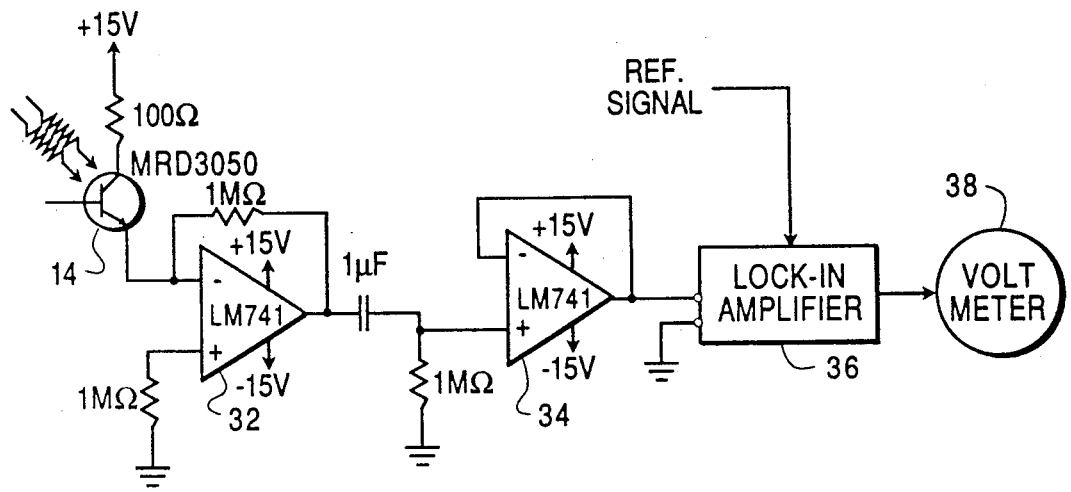
FIG. 2A shows a circuit for use with the photodetection device of FIG. 1.

For experiments in which the detection device 10 is to be used to measure oscillating displacement of a beam, as might be reflected from a torsional oscillator, the circuit of FIG. 2A may be used with the phototransistor 14 in order to implement equation 9 discussed above. Usually, one is tracking the response of the torsional oscillator as a drive frequency is swept and one is looking for any resonant frequencies. The circuit of FIG. 2A may be used also as a laser beam power (i.e., intensity) monitor provided that the beam is chopped. The phototransistor 14 is biased through a 100 ohm resistor with a first op-amp 32 providing a virtual ground. The phototransistor collector emitter impedance is must greater than 100 ohms such that the transistor is under constant voltage bias and its current response is approximately linear with incident intensity. The sensitivity may be optimized for a specific type of phototransistor by adjusting the value of the biasing resistor in accord with the data sheet of any specific manufacturer. The op-amp 32 acts as a current-to-voltage converter and, as shown, is ac coupled to a second op-amp 34 which acts as a unity gain follower. The output of amplifier 34 may be connected to a lock in amplifier 36. The lock in amplifier 36 may be a commonly used phase sensitive detection device such as manufactured by Princeton Applied Research, Stanford Research, or various other companies. The lock in amplifier 36 may be used where the phototransistor 14 is subject to light other than the light from the incident beam 20 (refer back momentarily to FIG. 1). In other words, if noise light may reach the phototransistor 14, the lock in amplifier 36 includes an illustrated input for receiving a reference signal having a frequency and phase corresponding to the frequency and phase of interest (such as the drive frequency of the torsional oscillator). The lock in amplifier 36 operates in known fashion to eliminate signals such that the output of amplifier 36 supplied to volt meter 38 (or any other suitable measurement device or circuit) will be only dependent upon the signals having the frequency and phase of interest as received by the photodetector or phototransistor 14. If an experiment is being done in a darkened enclosure or the phototransistor 14 is otherwise shielded from sources of noise light, the lock in amplifier 36 is unnecessary and the output of amplifier 34 may be directly supplied to a volt meter or other device to display and/or record the sensed voltage.

Figure 2B:
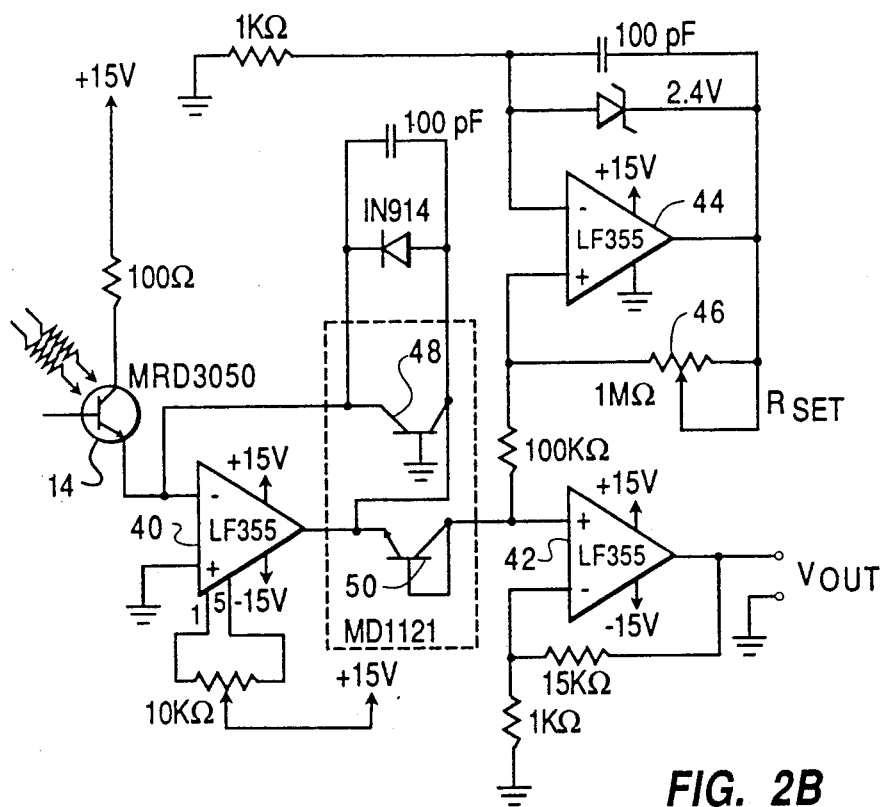
FIG. 2B shows an alternate circuit for use with the photodetection device of FIG. 1.

If the displacement of the beam which is to be sensed by the phototransistor 14 of FIG. 1 is static or non oscillatory, the behavior of the device 10 is defined by equation 7 above The circuit of FIG. 2B should then be used. This circuit, which is essentially a circuit described in the *Art of Electronics* by Horowitz et al, Cambridge University, Cambridge 1980, will give a signal which is linearly proportional to the laser beam displacement. The phototransistor 14 of FIG. 2B is biased in the same fashion as discussed above with respect to FIG. 2A. However, the op-amp 40 acts as a logarithmic current-to-voltage converter. The op-amp 42 takes the ratio between the output current of first op-amp 40 and a zener-stabilized constant current source including the op-amp 44. The output voltage from op-amp 42 is $$V_{out} = \log_{10}(I_t R_s / 2.4)$$

where $I_t$ is the phototransistor collector-emitter current, and $R_s$ is the setting upon a variable resistor 46 which is used to set the phototransistor current at which the output voltage is 0. This circuit is ideally capable of 7 decades of linearity and can handle the detector response for large displacements of the laser beam 20 (beam 20 in FIG. 1). The output from amplifier 42 in FIG. 2B may be supplied to a volt meter (not shown) or other circuit or device for displaying and/or recording the output voltage.

Although the circuit of FIG. 2B is quite similar to that discussed in the indicated book, a few remarks should be useful. The op-amp must have its input offset voltage properly zeroed (pins 1 and 5). This is done by disconnecting the phototransistor 14 from the circuit and monitoring the output of the first stage while it is disconnected from the second stage. The potentiometer connected to pins 1 and 5 is adjusted until the output or the op-amp is zero. Second, if discrete transistors are used in the feedback network for the op-amp 40 and for coupling the first and second op-amps 40 and 42, they must be well matched. A monolithic pair 48 and 50 are shown in FIG. 2B.

The data sheet for a phototransistor such as 14 in FIG. 2B will contain curves of current response versus incident intensity for specific bias conditions. By adjusting the resistor 46 in FIG. 2B, the output can quantify the light intensity at the phototransistor since the setting on resistor 46 determines the zero of the logarithmic response of the circuit. To perform this adjustment, the phototransistor 14 is disconnected from the circuit and a known current from a constant current source is injected into the input stage of the first op-amp 40. The resistor 46 is then adjusted until the output voltage $V_{out}$ is 0.

Figure 3A:
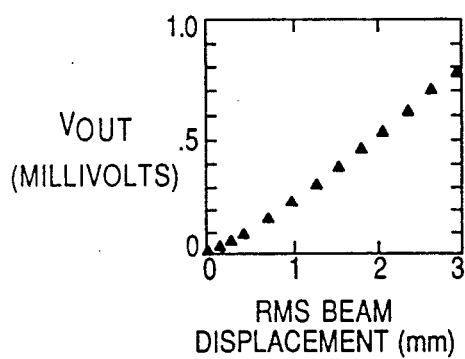
FIG. 3A shows the response of the photodetection device and circuit of FIG. 2A.

FIG. 3A shows the response of a specific device made using a microscope slide as the substrate 16 (refer back to FIG. 1) for measurement of oscillating beam displacements and using the circuit of FIG. 2A. Specifically, FIG. 3A shows the response of such an arrangement as a function of the route-mean-square beam displacement as discussed in detail below.

A collimated (0.1-mm-diam) He-Ne laser beam with a wavelength of 0.6326 μm was reflected from a mirror mounted on the drive coil of an acoustical speaker oriented 45° to the beam. The mirror speaker acted as a movable 90° mirror, allowing the reflected laser beam to be translated perpendicular to its direction of propagation. The beam was then incident upon the PSD or device 10 at the optimal angle (~30.5°) at a distance of 0.2 m from the mirror. The speaker was driven with a 1-kHz sine wave from a function generator, which resulted in the laser-beam position oscillating in a sinusoidal fashion. The output of the circuit in FIG. 2(a) was input into a lock-in amplifier as was a reference signal from the function generator. The amplitude of the drive to the speaker was varied, and the resulting response as indicated by the lock-in amplifier was measured. The beam displacement for a given speaker drive voltage was calibrated by removing the PSD and varying the speaker drive amplitude while the laser beam was allowed to strike a screen ~10 m away. The beam displacement could be directly measured on the screen as a result of the longer propagation distance.

As can be seen in FIG. 3A, the behavior of the detector-circuit system is essentially linear with the root mean square of the beam position, as one would expect if the detector obeyed Eq. (9). The maximum frequency of oscillation the device 10 PSD can measure will be limited by the first-stage op-amp in this circuit [FIG. 2A]. Decreasing the feedback resistor will increase the maximum frequency at the expense of the signal gain. Sensitivity to small displacements can be increased by decreasing the waveguide thickness.

The response of a PSD made to static beam displacements when used with the circuit in FIG. 2B is shown in FIG. A. This particular PSD differs from the one shown in FIG. 3A in that sapphire was used in its construction. A He-Ne laser beam was collimated to a diameter of 0.1 mm and the PSD mounted on a sliding platform in the beam path. The platform was then mounted on a dial caliper. The caliper allowed the detector to be moved perpendicular to the laser beam and the position measured to within ±25 μm. The PSD was oriented so that the laser beam struck the detector at the optimal angle (~30.5°). The detector was translated across the beam, and the output voltage of the circuit was measured at each position.

Figure 3B:
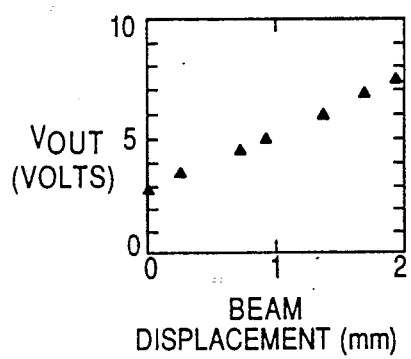
FIG. 3B shows the response of the photodetection device and circuit of FIG. 2B.

As can be seen in FIG. 3B, the behavior of the detector-circuit system is linear with beam position, as one would expect if the detector obeyed Eq. (7) and the circuit obeyed the logarithmic equation shown previously. The detector is quite sensitive, with the detector photocurrent varying approximately five orders of magnitude for a beam translation covering ~2 mm. Equation (7) indicates that the spatial sensitivity of the PSD can be increased by decreasing the thickness of the waveguide.

As FIG. 3B indicates, this PSD-circuit combination is able to measure at least a factor of $10^5$ change in transistor photocurrent. Assuming the photocurrent is approximately linear with intensity, the circuit is capable of detecting a $10^5$ change in light intensity at the phototransistor. This implies that the PSD, when used as a beam-power monitor mirror, would be capable approximately 100 dB of dynamic range of laser beam intensity.

Figure 4:
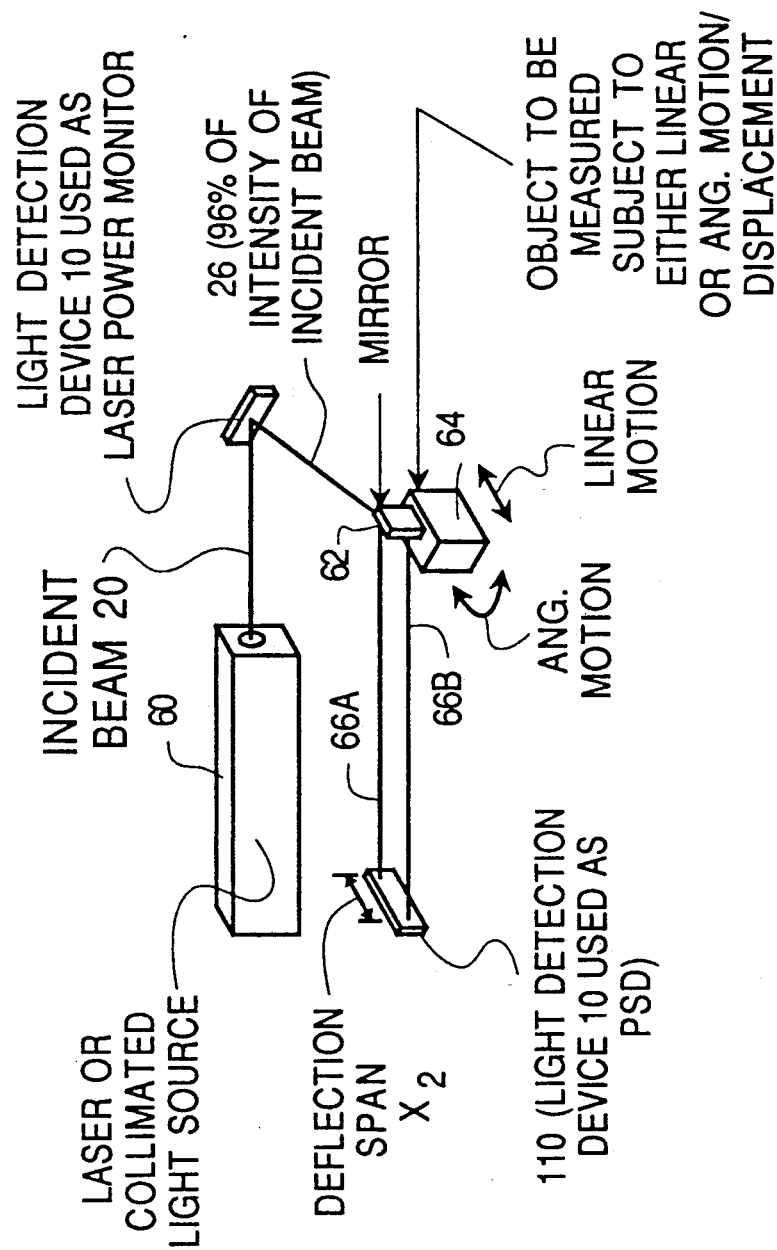
FIG. 4 shows a system using one of the photodetection devices of FIG. 1 as a power monitor and another of the photodetection devices as a position sensitive detector for measurement of motion or displacement of an object.

FIG. 4 shows how the light detection device 10 of the present invention could be used as part of a system for making measurements. In particular, the incident beam 20 is produced by a laser 60 and is applied to the light detection device 10 which is used as a laser power (i.e., intensity) monitor. It should be noted that the power monitor use of device 10 in FIG. 4 is optional and assumes that one wishes to monitor the power from the laser 60 while one is actually using the laser 60 to take another measurement. For example, if the laser 60 is somewhat unstable, it may be necessary to use the power monitor as shown in order to eliminate errors which might otherwise arise from instability in the laser 60. The power monitor shown as device 10 in FIG. 4 is of course constructed as discussed above and operates in the fashion shown in FIG. 1. The external reflected beam 26 includes 96% of the intensity of the incident beam in the preferred embodiment. However, as discussed above, this external reflected beam should at least include the bulk (more than half) of the light intensity which is incident upon the power monitor device 10. The external reflected beam 26 may then be used to perform useful measurements or experiments. In other words, and unlike most power monitors for lasers, the device 10 may use a relatively small portion such a 4% of the laser power in order to generate a signal representative of the actual laser power, while at the same time allowing the bulk of the laser power to be channeled for useful measurements or other work.

The external reflected beam 26 is applied to a mirror 62 upon an object 64 which is to be measured. The object 64 may be subject to linear motion or displacement as shown or may be subject to angular motion or displacement as shown. The object 64 would not be subject to both angular and linear motion, but these alternates are simply shown in the figure. If the object 64 were subject to angular motion, it would generally be cylindrical in shape.

The mirror 62 generates a secondary light beam 66A at one position for the mirror 62 and 66B at another position for the mirror 62. In other words, dependent upon the motion of object 64, the mirror 62 causes the beam from mirror 62 to hit the PSD 110 differently, thereby allowing the PSD 110 to generate an output depending upon the motion or displacement of object 64. The PSD 110 is of course instructed identical to the device 10 of FIG. 1 and it uses the device for monitoring the experiment whereas a device 10 which receives the incident beam 20 directly is used to monitor the laser power from laser 60.

The power monitor device 10 of FIG. 4 generates an output which is dependent upon the position and intensity of the incident beam 20. However, since the incident beam 20 is stationary in position, any variations in the output from the power monitor 10 of FIG. 4 corresponds to a variation in the intensity of the beam supplied by laser 60. This will allow one to compensate for the fact that the output from the PSD 110 of FIG. 4 varies not only with movement of the object 64 but also varies with changes in the energy supplied by lasers 60.

Figure 5:
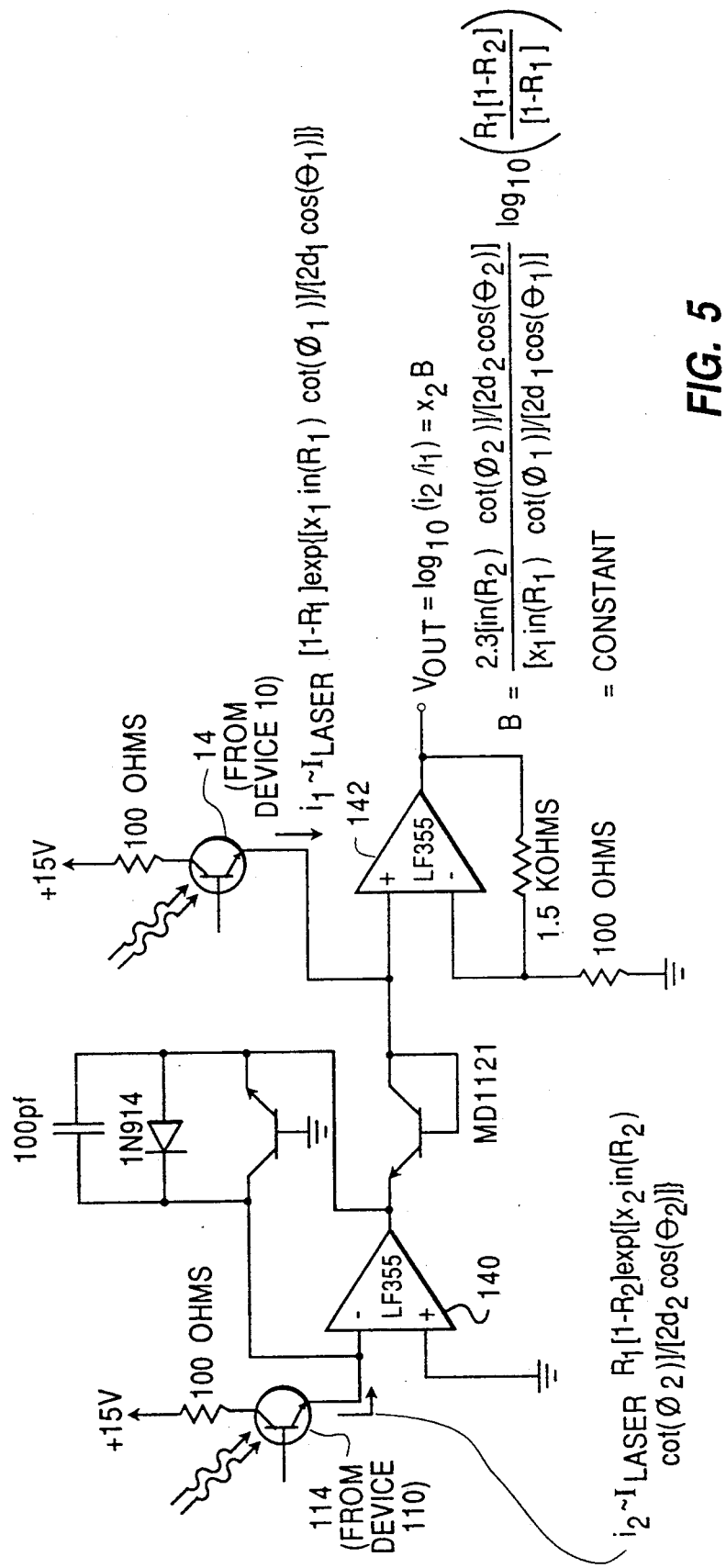
FIG. 5 shows a circuit for use in conjunction with the arrangement of FIG. 4.

FIG. 5 shows a circuit for use with the power monitor device 10 of FIG. 4 and the PSD 110 of FIG. 4 so as to provide an output which is independent of variations in the laser power 60. In particular, FIG. 5 shows such an arrangement wherein the phototransistor 14 from the power monitor device 10 supplies a current as shown which is dependent upon the light intensity from laser 60. For the equations which are illustrated in FIG. 5, the subscript 1 relates to the power monitor device 10, whereas the subscript 2 relates to the PSD 110. For example, $R_1$ refers to the coefficient of reflection of the partially reflecting side of the power monitor device 10 whereas $R_2$ refers to the coefficient of reflection of the partially reflecting side of the PSD 110 (it is assumed that one side of each of the devices is fully reflecting).

The circuit of FIG. 5 includes a first operational amplifier 140 and a second operational amplifier 142, which essentially function like corresponding amplifiers 40 and 42 of FIG. 2B. However, instead of having a constant current source such as provided by amplifier 44 of FIG. 2B, the phototransistor 14 supplies a current which depends upon the variations in the laser source 60 of FIG. 4. Accordingly, the amplifier 142 is able to supply an output voltage which is independent of variations in the laser source 60. As shown from the calculations, the output voltage of operational amplifier 142 is a linear function of $X_2$ and is independent of variations in the power from the laser 60.

The difference between the circuit of FIG. 5 and the one shown at FIG. 2B is the replacement of the zener-stabilized constant-current source with the photocurrent from a second of these devices used as a laser power monitor. If $I_{Laser}$ is the intensity of the beam as it exits the laser, then the intensity of light at the phototransistor 14 of the laser monitor will be given by equation 7 above with $I_{Laser}$ in place of $I_0$:

$$I_{MONITOR} = I_{Laser}[1-R_1]\exp\{x_1\ln(R_1)\cot(\phi_1)][2d_1\cos(\Theta_1)]\}$$

The intensity of light reflected from the device is $R_1 I_{Laser}$ where $R_1$ is the reflectivity of device #1 ($R_1 < 1$, $R \sim 0.96$ or 96% in the text devices described). $R_1, x_1, \phi_1, d_1, \Theta_1$, are as defined in above article with respect to FIG. 1 and with the subscript denoting the device number Note that $x_1$ does not vary when the device is used as a power monitor. Assuming the mirror on the apparatus whose displacement (linear or angular) we wish to measure is 100%, then the amount of light entering the device 110 being used as a PSD is $R_1 I_{Laser}$. The intensity of light at the phototransistor of device #2 (PSD) will also be given by equation (7) but with $R_1 I_{Laser}$ in place of $I_0$:

$$I_{PSD} = R_1 I_{Laser}[1-R_2]\exp\{x_2\ln(R_2)\cot(\phi_2)][2d_2\cos(\Theta_2)]\}$$

If photocurrent generated in the phototransistors is linear with light intensity then the photocurrents for devices 10 and 110 are:

$$i_1 = AI_{Laser}[1-R_1]\exp\{x_1\ln(R_1)\cot(\phi_1)][2d_1\cos(\Theta_1)]\}$$

$$i_2 = AR_1 I_{Laser}[1-R_2]\exp\{x_2\ln(R_2)\cot(\phi_2)][2d_2\cos(\Theta_2)]\}$$

where A is the Intensity to Current conversion constant for the phototransistors. $V_{OUT}$ for the circuit is the log of these two photocurrents:

$$V_{OUT} = \log_{10}(i_2/i_1)$$

$$V_{OUT} = x_2 B$$

where the constant B is given by:

$$B = \frac{2.3 ln(R_2)\cot(\phi_2)\}[2d_2\cos(\Theta_2)]\log_{10}(R_1[1-R_2]/[1-R_1])}{\{x_1 ln(R_1)\cot(\phi_1)\}[2d_1\cos(\Theta_1)]}$$

As used herein light includes wavelengths in the visible light spec-.rum and generally includes ultraviolet to infrared.

Although various specific materials, constructions, and arrangements have been shown for illustrative purposes, it is to be understood that various modifications and adaptations will be apparent to those of skill in this art. Accordingly, the scope of the present invention should be determined by reference to the claims appended hereto.

What is claimed is:

1. A light detection system comprising:
an elongate light conducting member having a substrate of transparent material with a first side and a second side, said first side having a partially reflecting surface, said second side having a reflecting surface which is at least partially reflecting, said light conducting member having an incident zone for entry of light into said light conducting member and a detection zone for detection of light which is a portion of the light which has entered into said light conducting member, which portion has a magnitude determined by multiple reflections between said first side and said second side; and
a photodetector mounted to sense said portion of the light at said detection zone, said photodetector being an individual detector which provides an output dependent on the position and intensity of light which hits the light conducting member at said incident zone, and wherein said first side is planar and said second side is planar and is parallel to said first side.

2. The light detection system of claim 1 wherein said partially reflecting surface on said first side is a continuous coating having a uniform coefficient of reflection from adjacent said incident zone to adjacent said detection zone.

3. The light detection system of claim 2 wherein said at least partially reflecting surface on said second side is a continuous coating having a uniform coefficient of reflection from adjacent said incident zone to adjacent said detection zone.

4. The light detection system of claim 1 wherein said light conducting member is solid.

5. The light detection system of claim 3 wherein said partially reflecting surface of said first surface has a coefficient of reflection of R and R is between 0.99 and 0.05.

6. The light detection system of claim 5 wherein said at least partially reflecting surface of said second side is fully reflecting.

7. The light detection system of claim 2 wherein said partially reflecting surface of said first surface has a coefficient of reflection of R and R is between 0.99 and 0.50.

8. The light detection system of claim 7 wherein R is between 0.98 and 0.90.

9. The light detection system of claim 1 wherein said photodetector is a phototransistor.

10. The light detection system of claim 1 further comprising a light source for directing light onto said first surface of said light conducting member.

11. A method of detecting light comprising the steps of:
applying light to an incident zone of an elongate first light conducting member having a substrate of transparent material with a first side and a second side such that the light repeatedly reflects between a partially reflecting surface on the first side and a reflecting surface which is at least partially reflecting on the second side, a portion of the applied light going to a detection zone; and using a first photodetector to sense said portion of the light at the detection zone, the first photodetector being an individual detector and providing an output dependent on the position and intensity of the light applied to the first light conducting member, and wherein said partially reflecting surface on said first side is a continuous coating of reflective material from adjacent said incident zone to adjacent said detection zone.

12. The method of claim 11 wherein said continuous coating has a uniform coefficient of reflection from adjacent and incident zone to adjacent said detection zone.

13. The method of claim 12 wherein said at least partially reflecting surface on said second side is a continuous coating having a uniform coefficient of reflection from adjacent said incident zone to adjacent said detection zone.

14. The method of claim 11 wherein the light is applied to the partially reflecting surface of said first side of said first light conducting member from an incident beam from a light source and over 50% of the incident beam is reflected as an external reflected beam, and said output is dependent on the intensity of the incident beam.

15. The method of claim 14 further comprising directing the external reflected beam to a mirror on an object whose motion is to be measured so as to generate a secondary reflected beam, and applying said secondary reflected beam to an incident zone of an elongate second light conducting member having a substrate of transparent material with a first side and a second side such that the light repeatedly reflects between a partially reflecting surface on the first side and a reflecting surface which is at least partially reflecting on the second side, the light going to a detection zone; and using a second photodetector to detect light at the detection zone of the second light conducting member, the second photodetector being an individual detector and providing an output dependent on the motion of the object and the intensity of the incident beam.

16. The method of claim 15 further comprising the step of supplying the outputs of the first and second photodetectors to a circuit which generates an output dependent on the motion of the object and independent of variations in the intensity of the incident beam.

17. The method of claim 11 further comprising directing light from a light source onto a mirror on an object whose motion is to be measured such that light reflected from said mirror is the light applied to the incident zone of the first light conducting member, said output of the first photoconductor being dependent on the motion of the object.

18. The method of claim 17 wherein said first side is planar and said second side is planar and is parallel to said first side.

19. The method of claim 18 wherein said partially reflecting surface of said first surface has a coefficient of reflection of R and R is between 0.99 and 0.50.

20. The method of claim 19 wherein R is between 0.98 and 0.90.

21. A light detection system comprising:

an elongate light conducting member having a substrate of transparent material with a first side and a second side, said first side having a partially reflecting surface, said second side having a reflecting surface which is at least partially reflecting, said light conducting member having an incident zone for entry of light into said light conducting member and a detection zone for detection of light which is a portion of the light which has entered into said light conducting member, which portion has a magnitude determined by multiple reflections between said first side and said second side; and a photodetector mounted to sense said portion of the light at said detection zone, said photodetector being an individual detector which provides an output dependent on the position and intensity of light which hits the light conducting member at said incident zone, and wherein said partially reflecting surface on said first side is a continuous coating of reflective material from adjacent said incident zone to adjacent said detection zone.

22. The light detection system of claim 21 wherein said continuous coating has a uniform coefficient of reflection from adjacent said incident zone to adjacent said detection zone.

23. The light detection system of claim 21 wherein said first side is planar and said second side is planar and is parallel to said first side.

* * * * *

UNITED STATES PATENT AND TRADEMARK OFFICE
CERTIFICATE OF CORRECTION

PATENT NO. : 5,045,684

DATED : September 3, 1991

INVENTOR(S) : Michael J. BURNS

It is certified that error appears in the above-identified patent and that said Letters Patent is hereby corrected as shown below:

In column 14, line 3 of claim 12: delete "and" and substitute -- said --

Signed and Sealed this

Tenth Day of November, 1992

*Attest:*

DOUGLAS B. COMER

*Attesting Officer*      *Acting Commissioner of Patents and Trademarks*